July 18, 1944.  L. V. NYSTROM  2,354,137
HEIGHT GAUGE
Filed July 10, 1943
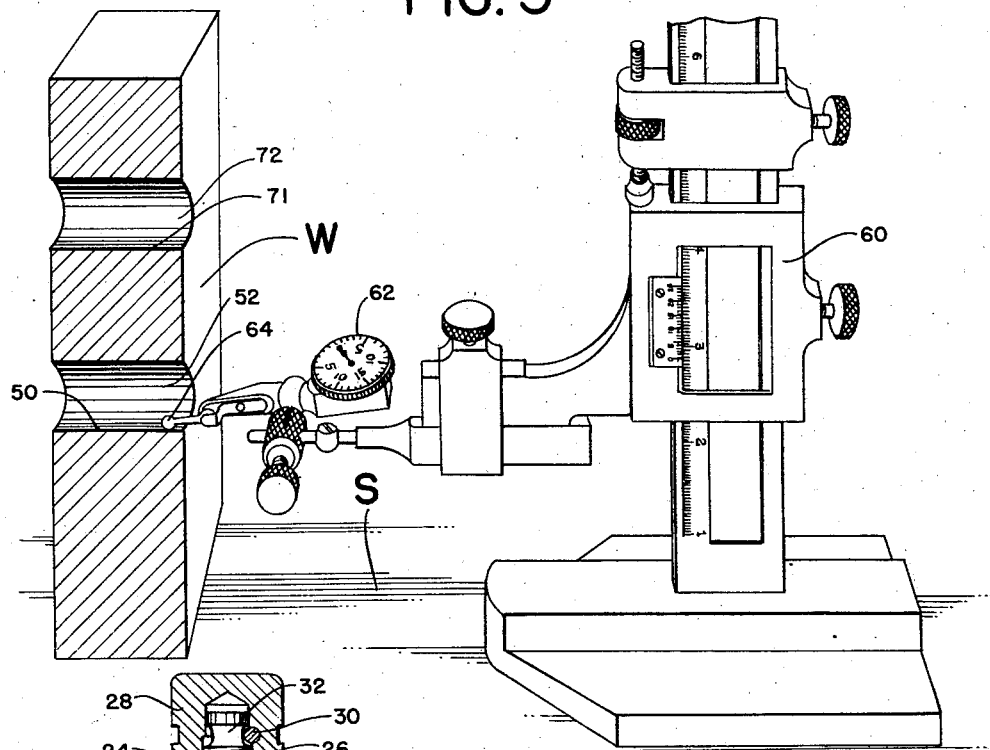
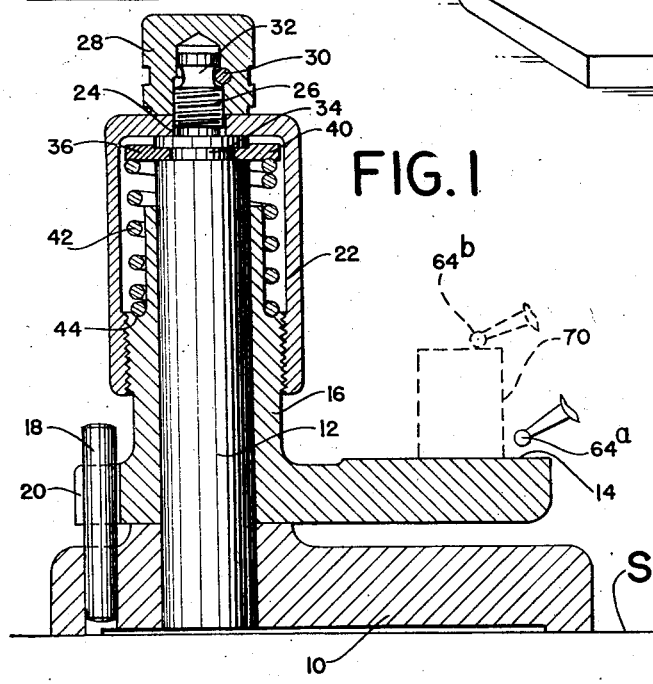
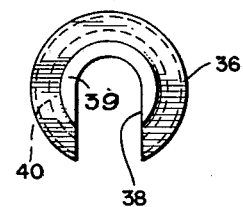
INVENTOR:-
LAWRENCE V. NYSTROM
BY Arthur R. Wylie
ATTY.

Patented July 18, 1944

2,354,137

UNITED STATES PATENT OFFICE 2,354,137

HEIGHT GAUGE

Lawrence V. Nystrom, Minneapolis, Minn., assignor to General Mills, Inc., a corporation of Delaware Application July 10, 1943, Serial No. 494,432

4 Claims. (Cl. 33—170)

An object of this invention is to provide a height gauge for use with dial gauges and Johansson gauge blocks for making accurate measurements of the heights of objects above a surface plate which has been scraped to an accuracy of about .0001" above or below a given plane.

The present use of Johansson gauge blocks requires that they be built up by trial and error until a desired height is attained as shown by the dial indicator which is carried on a vernier height gauge and which ordinarily is graduated to thousandths of an inch and by interpolation can be read to ten-thousandths. A given height, as obtained by the settling of a dial indicator, is often taken as the base above which other measurements may be taken. Instead of accurately measuring this height by building up Johansson gauge blocks as to now done, my invention provides an accurate plane surface parallel to the surface plate which can readily and accurately be adjusted to the height as indicated by the dial gauge after which all measurements may be made from the level of the surface plate as a reference plane. This may be done without measuring the height of this surface above the surface plate if desired. Johansson blocks may then be built up on this plane surface to read the height of the other levels above said plane surface.

Another object is the provision in an adjustable height gauge of means for removing any looseness or play between the several parts so that the gauge is much more positive and reliable in its action and more easily and rapidly adjustable.

These and other objects, as will hereinafter appear, are accomplished by this invention which is fully described in the following specification and shown in the accompanying drawing in which Figure 1 is a vertical section through my height gauge showing the nuts in partial elevation;

Fig. 2 is a plane view of a notched washer forming an abutment for a spring; and Fig. 3 is an elevation partly in section showing a vernier height gauge with a dial indicator at the time of making a height measurement.

The embodiment of my invention, as shown in Fig. 1, comprises a base 10 having a vertical opening into which is pressed a ground steel standard 12.

A platform 14 has at right angles thereto a sleeve 16, the latter being accurately bored and lapped to have a close-sliding fit on the ground standard 12. The base 10 has a hole into which a pin 18 is driven parallel to the standard 12. The platform 14 has a notched opening 20 which has a sliding fit on the pin 18, the pin preventing the rotation of the platform with respect to the base.

The sleeve is provided with fine screw threads, preferably 40 to the inch, to receive the screw threaded outer end of a hollow nut 22 which has a central opening 24 in its upper end adapted to pass over an extension 26 axially at the end of the standard 12. The inner end of the nut 22 is finished to fit accurately on the upper end of the standard 12. The extension 26 is screw threaded to receive a lock nut 28 for readily locking the nut in adjusted position. A pin 30 in the lock nut rotating freely in a groove 32 in the extension 26 prevents the lock nut from becoming unscrewed and lost.

A groove 34 near the upper end of the standard permits the insertion of a washer 36 (Fig. 2), the washer having a slot 38 adapted to pass around the narrowed portion of the pin at the groove 34. The under side of the washer is provided with a circular groove 40 which is concentric with the standard 12 and which is adapted to receive the upper end of a helical compression spring 42, the lower end of the compression spring being carried by a shoulder 44 on the sleeve 16. The upper side of the washer has a depression in which is seated the upper end of the standard 12 to center the washer.

This spring serves the purpose of holding the nut 22 in contact with the upper end of the standard and at the same time holds the sleeve 16 down against the nut 22 so that substantially the same pressure is exerted at all times upon the same sides of the threads in the sleeve and nut. Also, by placing the spring in this position, its pressure is always exerted between the sleeve 16 and the standard 12, neither of which can turn with respect to the other.

The bottom of the base is ground flat before the standard 12 is inserted. After assembling all the parts, as shown in Fig. 1, the top of the platform 14 is ground to parallelism with the bottom. The two will then remain parallel in all adjusted positions of the platform.

The operation of this height gauge is as follows: Referring to Fig. 3, a workpiece W rests upon a surface plate S which has been scraped to an accuracy of about .0001". This workpiece will have certain surfaces, the heights of which with respect to each other are to be measured. Thus the surface 50 forming the bottom of the hole 52 may be used as a surface of reference in obtaining the relative heights of other surfaces on or in the workpiece.

It is necessary therefore to establish first the height of the surface 50. To do this with my device a vernier height gauge 60 of a well known type is placed on the surface plate S and carries a dial indicator 62 which has a finger 64 which can be used as a measure of the height of the surface 50 above the surface plate. This is done in a well known manner by properly adjusting the vernier height gauge 60 and the dial indicator 62 so that the latter reads zero when the finger 64 lies in the bottom of the concave surface 50. The height gauge is then carefully withdrawn from the hole 52 without disturbing the setting of the finger 64 and the finger 64 springs back so that the dial indicator has a negative reading of say .005". The finger 64a is then placed over the platform 14 of my height gauge, as shown in Fig. 1, and the nut 22 turned so as to bring the top of the platform 14 up under the finger 64a lifting the finger 64a until the dial gauge again reads zero. The accuracy of this device is such that this setting can readily be made to an accuracy of about .0001". The lock nut 28 is then set locking the device in this position in which the top of the platform 14 has a height corresponding accurately to that of the surface 50.

My height gauge can now be moved about freely on the surface plate S so that measurements from the newly set platform 14 to various other levels on the workpiece can be made. It will be noted that often the height of the surface 50 above the surface plate S need not be measured in inches thereby saving considerable time and effort.

The amount of movement of the platform 14 as shown need not be very great since gauge blocks 70 (Fig. 1) of a known height may be added to give additional heights. In this case dial indicator fingers 64b serve to make the settings with these gauge blocks in the same way as has just been described for setting the device without them.

The heights of other holes on surfaces above the surface 50 may now be measured by the use of Johansson gauge blocks built upon the platform 14 until they assume the height of the desired surface such as the bottom 71 of the hole 72.

Thus it will be seen that I have provided a very simple and efficient device to be used in connection with Johansson gauge blocks. In practice it has been found that much less time is required to set the platform 14 to the height of the surface 50 than could be done with equal accuracy using the Johansson gauge blocks since the latter requires a great deal of cutting and trying on the part of an operator by substituting one gauge block for another until a pile of them is built up to the desired height.

The use of this device also saves the much more costly gauge block.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. A height gauge having a base, a standard rising from the base, a platform having a sleeve slidably mounted on the standard, means for preventing rotation of the platform with respect to the standard, a nut rotatably mounted on said standard and having a screw-threaded connection with said sleeve, means for locking the nut in any adjusted position, the top surface of the base and the bottom surface of the platform being parallel for all adjusted positions, and a single spring acting between the sleeve and the standard for preventing backlash between the nut and sleeve and for holding the nut firmly down against the upper end of the standard.

2. A height gauge having a base, a standard rising from the base, a platform having a sleeve slidably mounted on the standard, means for preventing rotation of the platform with respect to the standard, a nut rotatably mounted on said standard and having a screw-threaded connection with said sleeve, a second nut screwed on an extension of the standard for locking the nut in any adjusted position, the top surface of the base and the bottom surface of the platform being parallel for all adjusted positions, and a single spring acting between the sleeve and the standard for preventing backlash between the nut and sleeve and for holding the nut firmly down against the upper end of the standard.

3. A height gauge having a base, a standard rising from the base, a platform having a sleeve rising from the platform and slidably mounted on the standard, means for preventing rotation of the platform with respect to the standard, a nut rotatably mounted on said standard and having a screw-threaded connection with said sleeve, means for locking the nut in any adjusted position, the bottom of the base and the top of the platform being parallel for all adjusted positions, an abutment carried by the upper portion of the standard, and a compression spring abutting at its upper end on the abutment and at its lower end on the sleeve for preventing backlash between the nut and sleeve and for holding the nut in contact with the upper end of the standard.

4. A height gauge having a base, a standard rising from the base, a platform having a sleeve rising from the platform and slidably mounted on the standard, means for preventing rotation of the platform with respect to the standard, a nut rotatably mounted on said standard and having a screw-threaded connection with said sleeve, a second nut screwed on an extension of the standard for locking the nut in any adjusted position, the bottom of the base and the top of the platform being parallel for all adjusted positions, an abutment carried by the upper portion of the standard, and a compression spring abutting at its upper end on the abutment and at its lower end on the sleeve for preventing backlash between the nut and sleeve and for holding the nut in contact with the upper end of the standard.

LAWRENCE V. NYSTROM.